United States Patent [19]

Yamamoto et al.

[11] Patent Number: 4,733,953
[45] Date of Patent: Mar. 29, 1988

[54] COLOR CORRECTED PROJECTION LENS

[75] Inventors: Yoshiharu Yamamoto, Toyonaka; Yasuo Nakajima, Ibaraki; Syusuke Ono, Takatsuki, all of Japan

[73] Assignee: Matsushita Electric Industrial Co., Ltd., Osaka, Japan

[21] Appl. No.: 825,269

[22] Filed: Feb. 3, 1986

[30] Foreign Application Priority Data

Feb. 6, 1985 [JP] Japan ................................. 60-21257

[51] Int. Cl.$^4$ ........................... G02B 13/18; G02B 9/34
[52] U.S. Cl. ...................................................... 350/432
[58] Field of Search ................................. 350/432, 413

[56] References Cited

U.S. PATENT DOCUMENTS

3,912,379 10/1975 De Jager ........................... 350/413
4,606,607 8/1986 Kurihara ........................... 350/432

FOREIGN PATENT DOCUMENTS

57-108818 7/1982 Japan .
58-125007 7/1983 Japan .
58-139111 8/1983 Japan .
58-198017 11/1983 Japan .
59-155818 9/1984 Japan .
59-170812 9/1984 Japan .

*Primary Examiner*—John K. Corbin
*Assistant Examiner*—Rebecca D. Gass
*Attorney, Agent, or Firm*—Wenderoth, Lind & Ponack

[57] ABSTRACT

A color corrected projection lens with a large aperture ratio and a wide angle of view for producing on a screen an enlargement of an image appearing on a CRT, the lens having sequentially from the screen end a first unit of a bi-convex element having a positive power with a strongly convex surface directed toward the screen end, a second unit of a bi-concave element having a negative power and being located at or in the vicinity of the entrance pupil position of the entire lens system, a third unit of a bi-convex element having a positive power, and a fourth unit having a negative power with a strongly concave surface directed toward the screen end.

6 Claims, 6 Drawing Figures

COLOR CORRECTED PROJECTION LENS

BACKGROUND OF THE INVENTION

1. Field of the Invention

This invention relates to a projection lens and more particularly to a color corrected projection lens for use in a video projector which produces a large picture by projecting on a screen an image appearing on a cathode-ray tube (CRT).

2. Description of the Prior Art

Conventional projection lenses for projecting an image appearing on a CRT of a television receiver onto a screen are composed entirely of glass elements or composed entirely of plastic elements. Among these, one type comprise three units consisting of three elements having aspheric surfaces as disclosed, for example, in the Japanese Laid-open Patent Application No. 57-108818, and another type comprises three units consisting of four elements as in the Japanese Laid-open Patent Application No. 58-198017. When made entirely of plastic, the focal point of the lense changes significantly depending on the atmospheric temperature changes. Therefore, hybrid projection lenses composed of both glass elements and plastic elements have been proposed. Among these, one comprising three units consisting of three elements is known from, for example, the Japanese Laid-open Patent Application No. 58-125007, and another comprising three units consisting of four elements is disclosed, for example, in the Japanese Laid-open Patent Application No. 59-155818.

Generally, in a projection television using three CRTs, correction of chromatic aberration has not been required so much because CRT images of monochromatic colors of green, red and blue were magnified by the projection lens. However, the luminous spectrum of a phosphor of a CRT is spread, or is not strictly monochromatic. Compared with the luminous spectrum of a red light emitting phosphor, that of a blue or green light emitting phosphor spreads over a wider wavelength region.

Recently projection televisions have become used as information display terminals for computers. In this case, because of the necessity to magnify and project small character information, the projection lens is required to have greater resolution and clarity. Even if the monochromatic aberration is corrected and reduced, sufficient improvement of performance is not obtained. To solve this problem, a projection lens intended to correct the chromatic aberration is known. An all-plastic lens construction comprising four units consisting of four elements using aspheric surfaces is known from, for example, the Japanese Laid-open Patent Application No. 59-170812. A hybrid type of lens construction comprising four units consisting of five elements is known from the Japanese Laid-open Patent Application No. 58-139111.

In the conventional color corrected projection lenses, however, in the all-plastic lens construction, since the focal point is shifted significantly due to ambient temperature changes, a favorable picture quality can not be maintained, whereas in the hybrid construction which is stable against temperature changes, a bright projected image can not be obtained because the aperture ratio is as small as 1:1.3 to 1:1.4. In both constructions, moreover, since the half angle of view is as narrow as 20° to 23°, it is necessary to extend the projection distance, that is, the distance from the screen to the projection lens in order to obtain a large image, which is a bottleneck for reducing the size of the projection television set.

SUMMARY OF THE INVENTION

It is an object of this invention to provide a color corrected projection lens which can correct chromatic aberration and has high optical performance, stability to temperature changes, a large aperture ratio, and a wide angle of view, in a simple structure.

To achieve the above object, a color corrected projection lens of this invention comprises sequentially from the screen end a first unit of a positive bi-convex element having a strong convex surface directed toward the screen end, a negative second unit of a bi-concave element, a positive third unit of a bi-convex element, and a negative fourth unit having a strong concave surface directed toward the screen end. The second unit is located at or in the vicinity of the entrance pupil position of the entire lens system.

In this construction, a wide half angle of view of 25° to 28° and a large aperture ratio of 1:1.0 to 1:1.08 can be realized.

DESCRIPTION OF THE PREFERRED EMBODIMENTS

Figure 1:
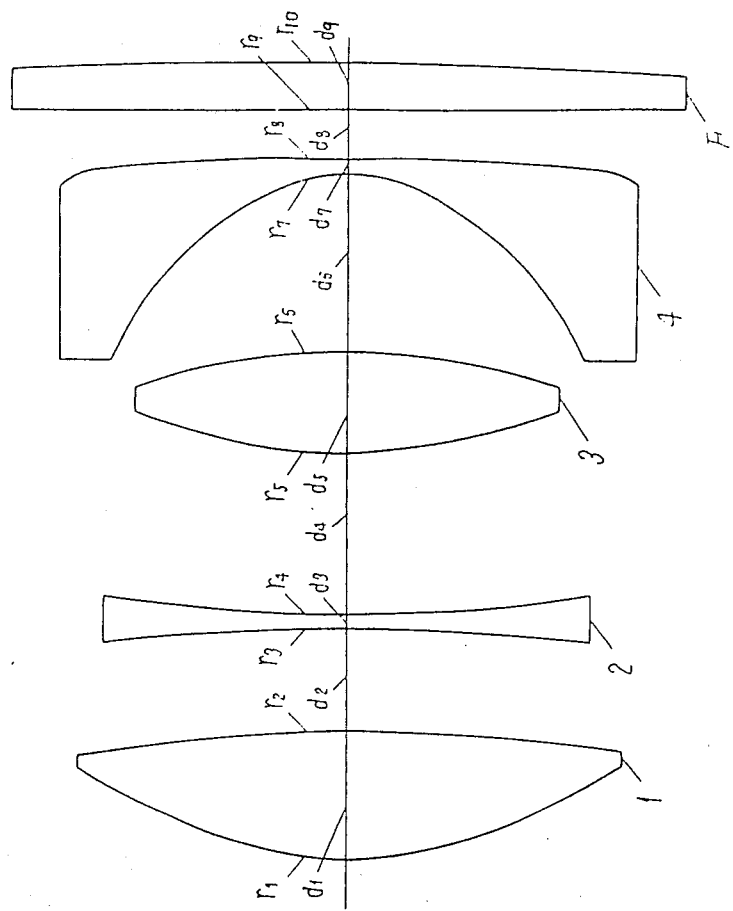
FIG. 1 is a schematic exploded view of a first embodiment of a color corrected projection lens according to this invention.
Figure 3:
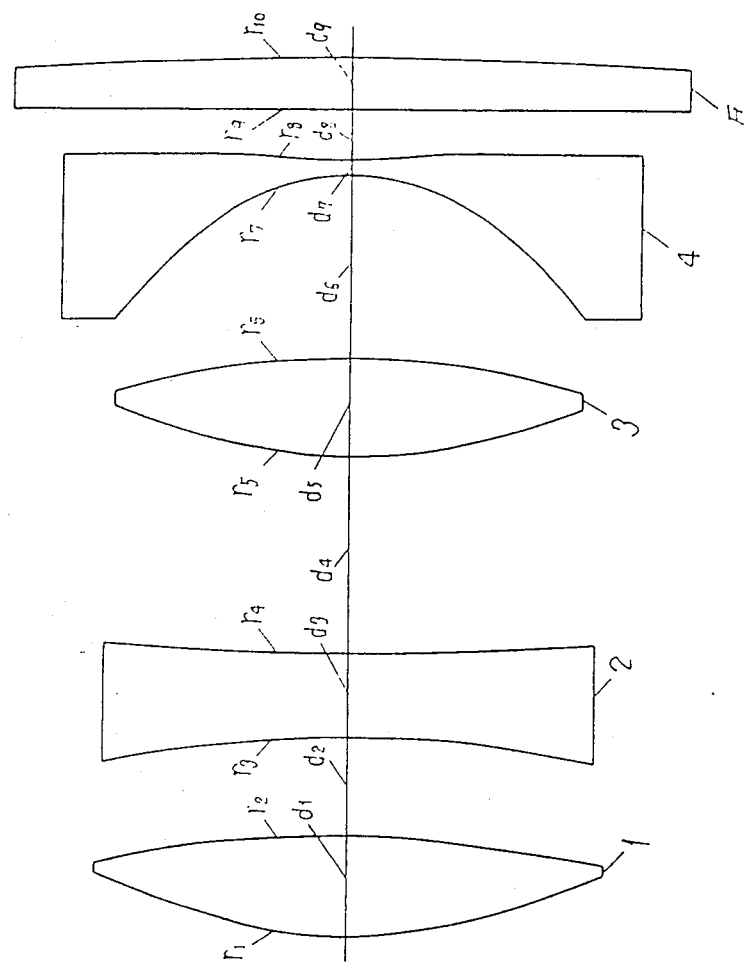
FIG. 3 is a schematic exploded view of a second embodiment of a color corrected projection lens according to this invention.

FIGS. 1 and 3 show color corrected projection lenses as first and second embodiments of the present invention. A screen (not shown) is placed at the left side of the figures.

The color corrected projection lens of the invention comprises, from the screen end, a first unit 1 of a positive bi-convex element having a strongly convex surface directed toward the screen end, a second unit 2 of a negative bi-concave element located at or in the vicinity of the entrance pupil position of the entire lens system, a third unit 3 of a positive bi-convex element, and a negative fourth unit 4 having a strongly concave surface directed toward the screen end. F is a face plate of a CRT. The lens is intended to cancel the lateral chromatic aberrations by generating an over-lateral chromatic aberration by the first and fourth unit and an under-lateral chromatic aberration by the third unit. The negative second unit is disposed at or in the vicinity of the entrance pupil position of the entire lens system so that the second unit can correct the longitudinal chromatic aberration without influencing the lateral chromatic aberration.

Performance of the color corrected projection lens of this invention can be further improved by satisfying the following conditions:

$$1.2 < f_1/f_3 < 1.6 \tag{1}$$

$$-1.4 < f/f_4 < -1.1 \tag{2}$$

$$0.35 < d_6/(d_2+d_3+d_4) < 0.75 \quad (3)$$

$$0.2 < d_2/(d_2+d_3+d_4) < 0.45 \quad (4)$$

$$-1.1 < (f_1+f_3)/f_2 < -0.7 \quad (5)$$

$$20 < \nu_1 - \nu_2 \quad (6)$$

where
- f: focal length of the entire lens system
- $f_1$: focal length of the first unit
- $f_2$: focal length of the second unit
- $f_3$: focal length of the third unit
- $f_4$: focal length of the fourth unit
- $\nu_1$: Abbe number of the first unit
- $\nu_2$: Abbe number of the second unit
- $d_2$: distance between the opposing surfaces of the first and second units
- $d_3$: thickness of the second unit
- $d_4$: distance between the opposing surfaces of the second and third units
- $d_6$: distance between the opposing surfaces of the third and fourth units The above conditions (1) to (4) relate to the correction of lateral chromatic aberration. Especially conditions (1) to (3) are requirements for cancelling the over-lateral chromatic aberration occurring in the first unit and the fourth unit by the under-lateral chromatic aberration occurring in the third unit. Condition (4) is to dispose the second unit so as to correct the longitudinal chromatic aberration without affecting the correction of the lateral chromatic aberration.

Condition (1) is to define the power distribution between the first and third units. When exceeding the lower limit, there occurs an overbalance of the lateral chromatic aberrations at the first unit and the third unit, and the lateral chromatic aberration of the entire lens system becomes excessive, which is not preferable. Furthermore, since the power of the first unit lens tends to be intensified, the principal point moves toward the screen end, and the back focal length becomes short. When exceeding the upper limit, the balance of the lateral chromatic aberrations occurring at the first and third units tends to be under, and it becomes difficult to correct the lateral chromatic aberration by the fourth unit. At the same time, the spherical aberration occurring at the third unit becomes large, so that, when the spherical aberration is corrected by the first and second units, excessive sagittal flare occurs.

Condition (2) is to define the power distribution of the fourth unit with respect to the entire lens system. When exceeding the lower limit, the over-lateral chromatic aberration occurring at the fourth unit increases, which makes it difficult to correct the lateral chromatic aberration of the entire lens system. At the same time, the Petzval sum becomes too small, so that the on-axis and off-axis optimum image positions deviate. When exceeding the upper limit, the over-lateral chromatic aberration occurring at the fourth unit becomes small, so that the lateral chromatic aberration of the entire lens system becomes under. At the same time, the Petzval sum is largely biased in the positive direction, so that the image curvature is under-corrected, thereby causing deviation of the off-axis optimum image position and on-axis optimum image position.

Condition (3) is to define the disposition of the first, third, and fourth units. If the lower limit is exceeded, the height of the off-axis chief ray entering the fourth unit becomes lower, so that the over-lateral chromatic aberration occurring at the fourth unit becomes small. As a result, the lateral chromatic aberration of the entire lens system is biased to the under side. Furthermore, the height of on-axis chief ray at the fourth unit becomes large, so that, when a sufficient image curvature correction is effected by the fourth unit, it becomes difficult to increase the aperture ratio. If the upper limit is exceeded, the height of the on-axis chief ray entering the fourth unit becomes excessive, so that the over-lateral chromatic aberration occurring at the fourth unit increases. As the result, a laterla chromatic aberration of the entire lens system is biased to the over side.

Condition (4) is to define the disposition of the second unit. By conditions (1) to (3), the lateral chromatic aberrations occurring at the first, third and fourth units are sufficiently corrected. Therefore in order to dispose the second unit in this condition without affecting the lateral chromatic aberration, it is required to dispose the second unit within the range of the condition (4). If the lower limit or upper limit is exceeded, the second unit cannot be located at or in the vicinity of the entrance pupil position of the entire lens system, so that the lateral chromatic aberration deteriorates.

Condition (5) is to define the power distribution of the negative second unit, with respect to the positive first and third units. If the lower limit is exceeded, the longtitudinal chromatic aberration can be corrected favorably, but it becomes difficult to increase the aperture ratio. If the upper limit, is exceeded the correction of the longitudinal chromatic aberration is insufficient.

Condition (6) is to define the relationship between the Abbe numbers of the first and second units. When this condition is not satisfied, it becomes difficult to increase the aperture ratio and correct the longitudinal chromatic aberration.

In the projection lens of this invention, it is furthermore preferable to satisfy the following conditions:

$$0.1 < d_5/f < 0.25 \quad (7)$$

$$1.7 < f_{12}/f < 2.5 \quad (8)$$

$$-6.5 < r_3/f < -1.8 \quad (9)$$

where
- f: focal length of the entire lens system
- $f_{12}$: total focal length of the first and second units
- $d_5$: thickness of the third unit
- $r_3$: curvature radius of the surface directing to the screen end of the second unit Condition (7) is to define the thickness of the third unit with respect to the focal length of the entire lens system. If the lower limit is exceeded, the astigmatism increases, so that the off-axis performance becomes insufficient. If the upper limit is exceeded, it becomes difficult to correct the lateral chromatic aberration, and the lens thickness becomes greater, thereby raising the cost.

Condition (8) is to define the ratio of the total focal length of the first and second units with respect to the focal length of the entire lens system. If the lower limit is exceeded, the back focal length becomes short, so that the face plate of the CRT and the fourth unit become too close to each other to radiate the generated heat sufficiently, resulting in a temperature rise. If the upper limit is exceeded, the quantity of light at the peripheral portion of the screen drops significantly.

Condition (9) is to define the radius of curvature of the surface directing to the screen end of the second lens. This surface is consequently a negative radius of curvature surface due to the necessity of correction of the spherical aberration or the longitudinal chromatic aberration occurring at the first unit. Therefore, if the lower limit is exceeded, the correction of the spherical aberration and the longitudinal chromatic aberration becomes insufficient. When exceeding the upper limit, the entrance angle of the off-axis ray becomes large, so that the astigmatism, coma and color coma at the peripheral part of the angle of view become too bad to correct sufficiently with the other lens elements. In the color corrected projection lens of the invention, at least one surface of the first unit is made aspherical so as to correct spherical aberration, distortion and coma, and at least the surface of the negative fourth unit directed toward the screen end is made aspherical so as to correct astigmatism and distortion. Hence, the aspheric elements of the first unit and the fourth unit are preferably plastic lenses which are lower in cost and are easier to manufacture. On the other hand, in order to control the movement of the focal point due to changes in ambient temperature, the third unit which is responsible for a considerably large portion of the positive power of the entire lens system is preferably a glass lens.

Hereinafter practical embodiments of this invention are described. In each embodiment, $r_1, r_2, r_3, \ldots$ denote curvature radii of the surfaces sequentially from the screen end; $d_1, d_2, d_3, \ldots$ denote thicknesses of and distances between the units from the screen end; $n_1, n_2, n_3, \ldots$ denote refractive indexes with respect to wavelength of $\lambda = 546$ nm of the units from the screen end; $\nu_1, \nu_2, \nu_3, \ldots$ denote Abbe numbers with respect to wavelength of $\nu = 546$ nm of the units from the screen end; $f_1, f_2, f_3, \ldots$ denote focal lengthes of the units from the screen end; $f_{12}$ denotes the total focal length of the first and second units; and f denotes the focal length of the entire lens system. F is the face plate of the CRT. The shape of each aspherical surface indicated by an asterisk (*) is a rotationally symmetrical aspheric surface being expressed as follows, supposing r to be the curvature at apex of the aspheric surface, K to be a conic constant, and AD, AE, AF, AG to be higher order constants in the orthogonal system of coordinates with the X-axis in the direction of the optical axis:

$$X = \frac{\frac{\rho^2}{r}}{1 + \sqrt{1 - (1 + K)\left(\frac{\rho}{r}\right)^2}} + AD \cdot \rho^4 + AE \cdot \rho^6 + AF \cdot \rho^8 + AG \cdot \rho^{10}$$

$$\rho = \sqrt{Y^2 + Z^2}$$

First embodiment f = 130.320     Aperture ratio 1:1.0
Magnification −0.07     Half angle of view 28°
$f_1 = 156.588$     $f_2 = -334.712$     $f_3 = 119.846$
$f_4 = -97.738$     $f_{12} = 238.553$     $f_1/f_3 = 1.31$
$f/f_4 = -1.33$     $d_6/(d_2 + d_3 + d_4) = 0.65$
$d_2/(d_2 + d_3 + d_4) = 0.36$     $(f_1 + f_3)/f_2 = -0.83$
$\nu_1 - \nu_2 = 31.7$     $d_5/f = 0.18$     $f_{12}/f = 1.83$
$r_3/f = -5.94$

| | | | | | |
|---|---|---|---|---|---|
| First unit | $r_1 = 92.508$ | $d_1 = 30.00$ | $n_1 = 1.49294$ | $\nu_1 = 57.0$ | * |
| | $r_2 = -416.197$ | $d_2 = 23.39$ | | | * |
| Second unit | $r_3 = -773.490$ | $d_3 = 4.00$ | $n_2 = 1.81264$ | $\nu_2 = 25.3$ | |
| | $r_4 = 420.502$ | $d_4 = 38.11$ | | | |
| Third unit | $r_5 = 146.358$ | $d_5 = 23.00$ | $n_3 = 1.68081$ | $\nu_3 = 55.2$ | |
| | $r_6 = -172.647$ | $d_6 = 42.44$ | | | |
| Fourth unit | $r_7 = -56.576$ | $d_7 = 4.00$ | $n_4 = 1.49294$ | $\nu_4 = 57.0$ | * |
| | $r_8 = 332.193$ | $d_8 = 11.30$ | | | * |
| F | $r_9 = \infty$ | $d_9 = 11.30$ | $n_5 = 1.50701$ | | |
| | $r_{10} = -2350.000$ | | | | |

Coefficient of aspheric surface

| | K | AD | AE | AF | AG |
|---|---|---|---|---|---|
| First surface: | $-2.98371 \times 10^{-1}$ | $-1.13396 \times 10^{-7}$ | $-5.18819 \times 10^{-12}$ | $-3.11515 \times 10^{-15}$ | $-5.31172 \times 10^{-19}$ |
| Second surface: | 0.0 | $7.61591 \times 10^{-8}$ | $-1.19864 \times 10^{-11}$ | $-1.70684 \times 10^{-15}$ | $1.99136 \times 10^{-19}$ |
| Seventh surface: | $-6.09498 \times 10^{-1}$ | $-3.65481 \times 10^{-6}$ | $1.52899 \times 10^{-9}$ | $-4.34740 \times 10^{-14}$ | $-5.57238 \times 10^{-17}$ |
| Eighth surface: | 0.0 | $-2.26468 \times 10^{-6}$ | $6.93637 \times 10^{-10}$ | $-5.96819 \times 10^{-14}$ | $-2.25483 \times 10^{-18}$ |

Second embodiment f = 131.430     Aperture ratio 1:1.08
Magnification −0.07     Half angle of view 25°
$f_1 = 160.518$     $f_2 = -281.073$     $f_3 = 108.890$
$f_4 = -101.319$     $f_{12} = 285.028$     $f_1/f_3 = 1.47$
$f/f_4 = -1.30$     $d_6/(d_2 + d_3 + d_4) = 0.49$
$d_2/(d_2 + d_3 + d_4) = 0.26$     $(f_1 + f_3)/f_2 = -0.96$
$\nu_1 - \nu_2 = 31.7$     $d_5/f = 0.18$     $f_{12} = 2.17$
$r_3/f = -2.31$

| | | | | | |
|---|---|---|---|---|---|
| First unit | $r_1 = 105.148$ | $d_1 = 24.00$ | $n_1 = 1.49294$ | $\nu_1 = 57.0$ | * |

-continued

|  | | | |
|---|---|---|---|
| | $r_2 = -295.628$ | $d_2 = 23.00$ | | | * |
| Second unit | $r_3 = -303.011$ | $d_3 = 20.00$ | $n_2 = 1.81264$ | $v_2 = 25.3$ |
| | $r_4 = 955.215$ | $d_4 = 46.00$ | | |
| Third unit | $r_5 = 129.893$ | $d_5 = 23.50$ | $n_3 = 1.72341$ | $v_3 = 50.1$ |
| | $r_6 = -184.952$ | $d_6 = 44.00$ | | |
| Fourth unit | $r_7 = -62.901$ | $d_7 = 4.00$ | $n_4 = 1.49294$ | $v_4 = 57.0$ * |
| | $r_8 = 247.546$ | $d_8 = 11.30$ | | * |
| F | $r_9 = \infty$ | $d_9 = 11.30$ | | |
| | $r_{10} = -2350.000$ | | | |

| Coefficient of aspheric surface | | | | | |
|---|---|---|---|---|---|
| | K | AD | AE | AF | AG |
| First surface: | $-3.44481 \times 10^{-1}$ | $-1.51906 \times 10^{-7}$ | $1.77335 \times 10^{-11}$ | $-9.44829 \times 10^{-15}$ | $-1.31041 \times 10^{-19}$ |
| Second surface: | 0.0 | $-3.65923 \times 10^{-8}$ | $6.05177 \times 10^{-12}$ | $1.96865 \times 10^{-15}$ | $-9.35704 \times 10^{-19}$ |
| Seventh surface: | $-8.27440 \times 10^{-1}$ | $-2.34074 \times 10^{-6}$ | $8.17269 \times 10^{-10}$ | $-1.45157 \times 10^{-13}$ | $1.50963 \times 10^{-17}$ |
| Eighth surface: | 0.0 | $-1.35724 \times 10^{-6}$ | $4.21621 \times 10^{-10}$ | $-6.44595 \times 10^{-14}$ | $3.93434 \times 10^{-18}$ |

Figure 2:
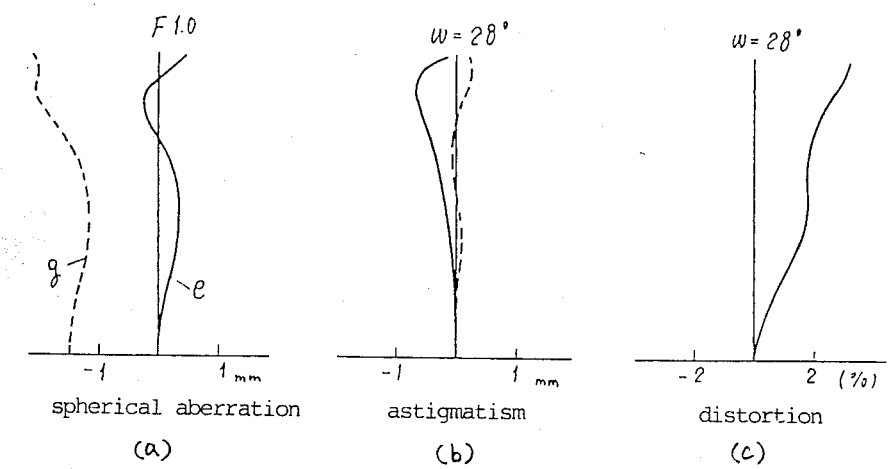
FIG. 2a shows spherical aberration, FIG. 2b astigmatism and FIG. 2c distortion of the first embodiment.
Figure 4:
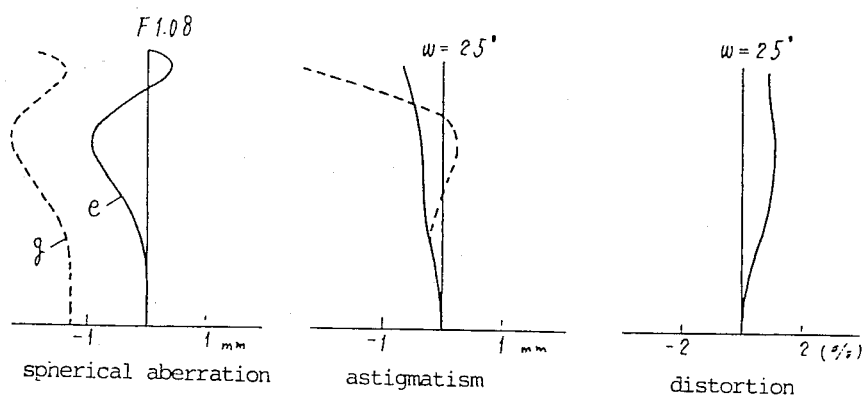
FIG. 4a shows spherical aberration, FIG. 4b astigmatism and FIG. 4c distortion of the second embodiment.

The lens configurations of the first and second embodiments are shown in FIGS. 1 and 2, and the respective aberration diagrams (spherical aberration, astigmatism and distortion) are shown in FIGS. 2 and 4.

What is claimed is:

1. A color corrected projection lens for producing on a screen an enlargement of an image appearing on a cathode-ray tube (CRT), comprising, sequentially from the screen end:

a first unit for correcting spherical aberration, coma and distortion, which is made of bi-convex element having a positive power at least one surface of which is an aspheric surface, the surface of said first unit directed toward the screen end being strongly convex;

a seond unit for mainly correcting longitudinal chromatic abberation, which i made of a bi-concave element having a negative power and disposed at or in the vicinity of an entrance pupil position of said lens;

a third unit for correcting astigmatism and distortion, which is made of a bi-convex element having a positive power; and a fourth unit having a negative power and having a concave surface directed toward the screen end which is strongly concave, at least said strongly concave surface of said fourth unit being an aspheric surface.

2. A color corrected projection lens as set forth in claim 1, wherein the following conditions are satisfied:

$$1.2 < f_1/f_3 < 1.6$$

$$-1.4 < f/f_4 < -1.1$$

$$0.35 < d_6/(d_2+d_3+d_4) < 0.75$$

$$0.2 < d_2/(d_2+d_3+d_4) < 0.45$$

$$-1.1 < (f_1+f_3)/f_2 < -0.7$$

$$20 < v_1-v_2$$

where:
   f is focal length of said lens;
   $f_1$, focal length of said first unit;
   $f_2$, focal length of said second unit;
   $f_3$, focal length of said third unit;
   $f_4$, focal length of said fourth unit;
   $v_1$, Abbe number of said first unit;
   $v_2$, Abbe number of said second unit;
   $d_2$, a distance between said first unit and said second unit;
   $d_3$, a thickness of said second unit;
   $d_4$, a distance between said second unit and said third unit; and
   $d_6$, a distance between said third unit and said fourth unit.

3. A color corrected projection lens as set forth in claim 1, wherein the following conditions are satisfied:

$$0.1 < d_5/f < 0.25$$

$$1.7 < f_{12}/f < 2.5$$

$$-6.5 < r_3/f < -1.8$$

where:
   f is focal length of said lens;
   $f_{12}$, total focal length of said first and second units;
   $d_5$, a thickness of said third unit; and
   $r_3$, a curvature radius of a surface directing to the screen end of said second unit.

4. A color corrected projection lens as set forth in claim 1, wherein said first and fourth units are made of plastic, and said third unit is made of glass.

5. A color corrected projection lens as set forth in claim 1, substantially described as follows:
   4–130.320 mm, aperture ratio=1.10, magnification=−0.07, half angle of view=28°,

| | | | | |
|---|---|---|---|---|
| first unit | $r_1 = 92.508$ | $d_1 = 30.00$ | $n_1 = 1.49294$ | $v_1 = 57.0$ |
| | $r_2 = -416.197$ | $d_2 = 23.39$ | | |
| | $r_3 = -773.490$ | $d_3 = 4.00$ | $n_2 = 1.81264$ | $v_2 = 25.3$ |

-continued

| | | | | | |
|---|---|---|---|---|---|
| second unit | { | $r_4 = 420.502$ | $d_4 = 38.11$ | | |
| third unit | { | $r_5 = 146.358$ | $d_5 = 23.00$ | $n_3 = 1.68081$ | $\nu_3 = 55.2$ |
| | | $r_6 = -172.647$ | $d_6 = 42.44$ | | |
| fourth unit | { | $r_7 = -56.576$ | $d_7 = 4.00$ | $n_4 = 1.49294$ | $\nu_4 = 57.0$ |
| | | $r_8 = 332.193$ | $d_8 = 11.30$ | | |
| F | { | $r_9 = \infty$ | $d_9 = 11.30$ | $n_5 = 1.50701$ | |
| | | $r_{10} = -2350.000$ | | | |

Coefficient of aspheric surface

| | K | AD | AE | AF | AG |
|---|---|---|---|---|---|
| first surface: | $-2.98371 \times 10^{-1}$ | $-1.13396 \times 10^{-7}$ | $-5.18819 \times 10^{-12}$ | $-3.11515 \times 10^{-15}$ | $-5.31172 \times 10^{-19}$ |
| second surface: | 0.0 | $7.61591 \times 10^{-8}$ | $-1.19864 \times 10^{-11}$ | $-1.70684 \times 10^{-15}$ | $1.99136 \times 10^{-19}$ |
| seventh surface: | $-6.09498 \times 10^{-1}$ | $-3.65481 \times 10^{-6}$ | $1.52899 \times 10^{-9}$ | $-4.34740 \times 10^{-14}$ | $-5.57238 \times 10^{-19}$ |
| eighth surface: | 0.0 | $-2.26468 \times 10^{-6}$ | $6.93637 \times 10^{-10}$ | $-5.96819 \times 10^{-14}$ | $-2.25483 \times 10^{-18}$ | where:

$r_1, r_2, r_3 \ldots$ are curvature radii of surfaces sequentially from the screen end;

$d_1, d_2, d_3 \ldots$, thicknesses of and distances between said units from the screen end;

$n_1, n_2, n_3 \ldots$, refractive indexes with respect to wavelength of 546 nm of said units from the screen end;

$\nu_1, \nu_2, \nu_3 \ldots$, Abbe numbers with respect to wavelength of 546 nm of said units from the screen end;

F, a face plate of said CRT:

the shape of each aspheric surface indicated by asterisk (*) being a rotationally symmetrical aspheric surface expressed as follows, supposing r to be a curvature at the apex of said spheric surface, K to be a conical constant, and AD, AE, AF, AG to be higher order constants in an orthogonal system of coordinates with X-axis in the direction of optical axis:

$$X = \frac{\frac{\rho^2}{r}}{1 + \sqrt{1 - (1 + K)\left(\frac{\rho}{r}\right)^2}} + AD \cdot \rho^4 + AE \cdot \rho^6 + AF \cdot \rho^8 + AG \cdot \rho^{10}$$

$$\rho = \sqrt{Y^2 + Z^2}.$$

6. A color corrected projection lens as set forth in claim 1, substantially described as follows:

f=131.430 mm, aperture ratio=1:1.08, magnification=−0.07, half angle of view=25°,

| | | | | | |
|---|---|---|---|---|---|
| first unit | { | $r_1 = 105.148$ | $d_1 = 24.00$ | $n_1 = 1.49294$ | $\nu_1 = 57.0$ |
| | | $r_2 = -295.628$ | $d_2 = 23.00$ | | |
| second unit | { | $r_3 = -303.011$ | $d_3 = 20.00$ | $n_2 = 1.81264$ | $\nu_2 = 25.3$ |
| | | $r_4 = 955.215$ | $d_4 = 46.00$ | | |
| third unit | { | $r_5 = 129.893$ | $d_5 = 23.50$ | $n_3 = 1.72341$ | $\nu_3 = 50.1$ |
| | | $r_6 = -184.952$ | $d_6 = 44.00$ | | |
| fourth unit | { | $r_7 = -62.901$ | $d_7 = 4.00$ | $n_4 = 1.49294$ | $\nu_4 = 57.0$ |
| | | $r_8 = 247.546$ | $d_8 = 11.30$ | | |
| F | { | $r_9 = \infty$ | $d_9 = 11.30$ | | |
| | | $r_{10} = -2350.000$ | | | |

Coefficient of aspheric surface

| | K | AD | AE | AF | AG |
|---|---|---|---|---|---|
| first surface: | $-3.44481 \times 10^{-1}$ | $-1.51906 \times 10^{-7}$ | $1.77335 \times 10^{-11}$ | $-9.44829 \times 10^{-15}$ | $-1.31041 \times 10^{-19}$ |
| second surface: | 0.0 | $-3.65923 \times 10^{-8}$ | $6.05177 \times 10^{-12}$ | $1.96865 \times 10^{-15}$ | $-9.35704 \times 10^{-19}$ |
| seventh surface: | $-8.27440 \times 10^{-1}$ | $-2.34074 \times 10^{-6}$ | $8.17269 \times 10^{-10}$ | $-1.45157 \times 10^{-13}$ | $1.50963 \times 10^{-17}$ |
| eighth surface: | 0.0 | $-1.35724 \times 10^{-6}$ | $4.21621 \times 10^{-10}$ | $-6.44595 \times 10^{-14}$ | $3.93434 \times 10^{-18}$ | where:

$r_1, r_2, r_3 \ldots$ are curvature radii of surfaces sequentially from the screen end;

$d_1, d_2, d_3 \ldots$, thicknesses of and distances between said units from the screen end;

$n_1, n_2, n_3 \ldots$, refractive indexes with respect to wavelength of 546 nm of said units from the screen end;

$\nu_1, \nu_2, \nu_3 \ldots$, Abbe numbers with respect to wavelength of 546 nm of said units from the screen end;

F, a face plate of said CRT:

the shape of each aspheric surface indicated by asterisk (*) being a rotationally symmetrical aspheric surface expressed as follows, supposing r to be a curvature at the apex of said spheric surface, K to be a conical constant, and AD, AE, AF, AG to be higher order constants in an orthogonal system of coordinates with X-axis in the direction of optical axis:

$$X = \frac{\frac{\rho^2}{r}}{1 + \sqrt{1 - (1+K)\left(\frac{\rho}{r}\right)^2}} + AD \cdot \rho^4 + AE \cdot \rho^6 + AF \cdot \rho^8 + AG \cdot \rho^{10}$$

$$\rho = \sqrt{Y^2 + Z^2}.$$

* * * * *